(12) United States Patent
Ross et al.

(10) Patent No.: US 6,618,462 B1
(45) Date of Patent: Sep. 9, 2003

(54) DIGITAL FREQUENCY DIVIDER

(75) Inventors: John M. Ross, Matawan, NJ (US); Peter Keller, Tinton Falls, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 10/077,114

(22) Filed: Feb. 15, 2002

Related U.S. Application Data
(60) Provisional application No. 60/270,059, filed on Feb. 20, 2001.

(51) Int. Cl.[7] .............................................. H03K 21/00
(52) U.S. Cl. ......................... 377/48; 327/115; 327/117
(58) Field of Search ........................... 377/48; 327/115, 327/117

(56) References Cited

U.S. PATENT DOCUMENTS

| | | | |
|---|---|---|---|
| 5,088,057 A | 2/1992 | Amrany et al. | 364/703 |
| 5,970,110 A | 10/1999 | Li | 377/48 |
| 6,157,694 A | 12/2000 | Larsson | 377/48 |

*Primary Examiner*—Margaret R. Wambach
(74) *Attorney, Agent, or Firm*—Thomas, Kayden, Horstemeyer & Risley

(57) ABSTRACT

A system and method is presented for dividing a reference clock frequency by any real number. The invention allows for a real number divisor that could have any desired degree of precision. Additionally, the invention seeks to minimize hardware complexity in realizing such a reference-clock frequency divider. In one particular embodiment of the invention, a system and method is presented, wherein the real number divisor is a real number having a repeating decimal (i.e., the real number may be represented by a fraction).

56 Claims, 13 Drawing Sheets

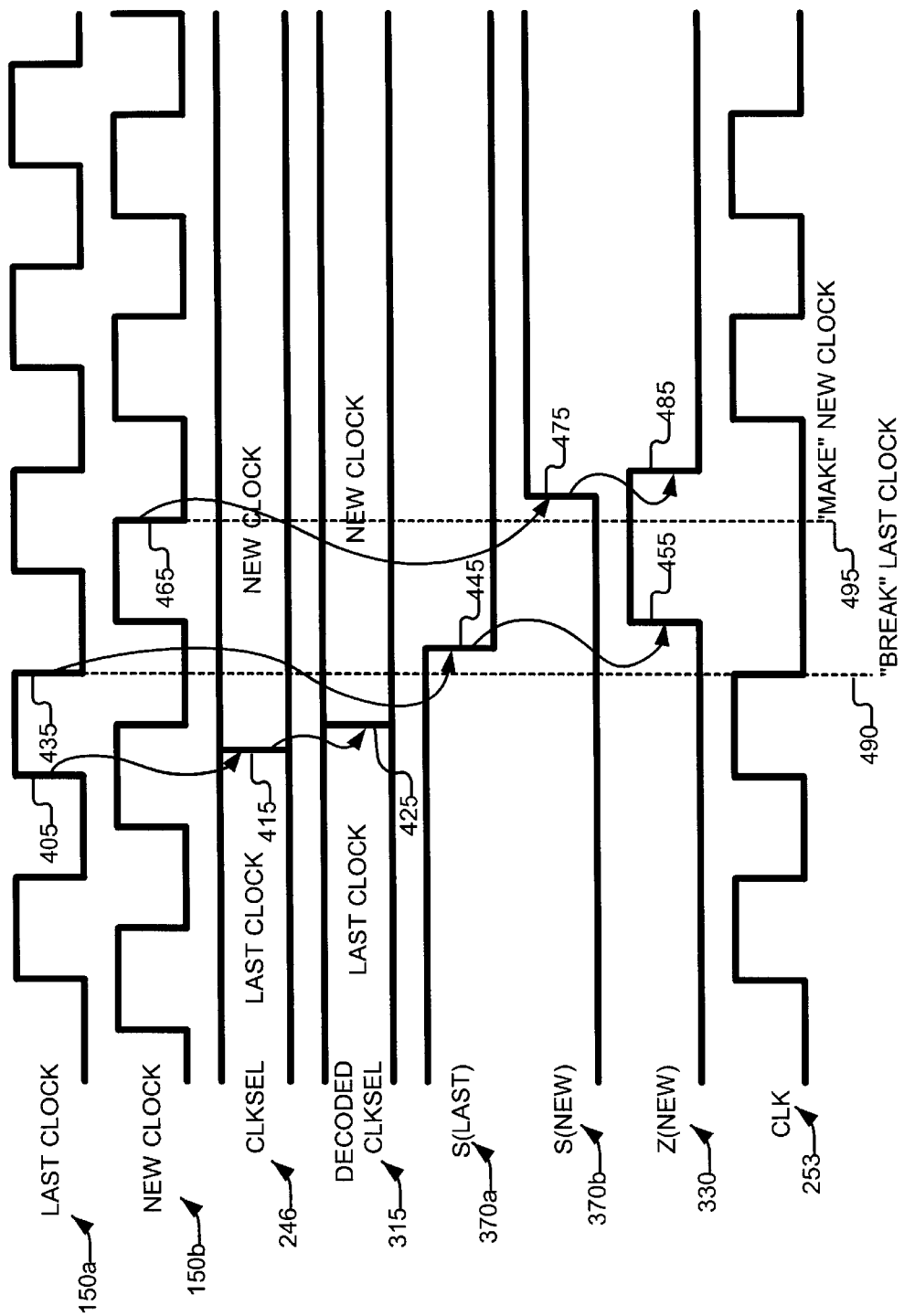

DIGITAL FREQUENCY DIVIDER

CROSS REFERENCE TO RELATED APPLICATIONS

This application claims the benefit of U.S. Provisional Patent Application No. 60/270,059, dated Feb. 20, 2001, which is incorporated herein by reference in its entirety.

FIELD OF INVENTION

The present invention generally relates to divider circuitry and, more particularly, relates to a system and method for fractionally dividing a clock frequency.

BACKGROUND

In modern digital circuitry, such as digital signal processors, it is often advantageous to generate multiple clock signals of various frequencies from a smaller set of reference frequencies. Additionally, some applications call for these multiple generated frequencies to be non-integer multiples of the reference frequency. Furthermore, these applications may also call for each generated frequency to have no common factors with the other generated clock frequencies (i.e., the ratio of each generated frequency to the reference frequency might not share any prime factors with other generated frequencies). In many cases, it is also desirable that the generated frequencies be software or firmware controlled to accommodate different applications.

To date, many solutions exist that employ numerous analog circuits, such as voltage-controlled oscillators (VCO) and phase-locked loops (PLL). However, these circuits are costly to implement due to their relatively large size, power requirements, and sensitivity to electrical as well as physical design rules. In addition to these cumbersome and costly analog circuits, several current approaches allow for the generation of multiple clock frequencies using a single clock frequency as the input clock for multiple clock-dividers. In several of these systems, a clock divider may be easily constructed to divide a reference frequency by powers of two (i.e., $2^n$) or by integer values. However, the complexity of the system increases when the divisor is a non-integer value.

Several approaches exist for non-integer division of clock frequencies, such as a rational-rate multiplier (RRM) approach (e.g., U.S. Pat. No. 5,088,057) or a fractional-frequency divider (FFD) approach (e.g., U.S. Pat. Nos. 5,970,110 and 6,157,694).

In the RRM approach, the reference clock frequency is divided by one of two integer values to produce a frequency higher than the desired frequency or a frequency lower than the desired frequency. The system then switches between these two clock frequencies to produce a desired average clock frequency. Thus, in the RRM approach, the desired clock frequency is composed of two different clock frequencies that "average" to the desired clock frequency. For example, a desired frequency of 5/8 or 0.625 times the input frequency can be created by generating two cycles equal to the reference frequency for every three cycles equal to one-half of the reference frequency. The instantaneous frequency would, therefore, be equal to either the reference clock frequency or half of the reference clock frequency, but the average frequency would be 5/8 the input clock frequency. The inherent limitation of this technique is that the clock appears to jitter by one full clock cycle. Additionally, the peak frequency may be much higher than the average frequency, thereby requiring circuitry utilizing the clock to be designed for higher speed operation than what is actually required.

Another technique is the FFD, as disclosed in U.S. Pat. No. 6,157,694. In the FFD approach, the system maintains multiple copies of the reference clock that differ only in phase, which may be generated in various ways such as multi-phase phase-locked loops (PLL) or multi-tapped delay-locked loops (DLL). For such an approach, each copy of the clock is phase shifted so that the cycle of each of the clocks is equidistant from the cycle of each adjacent clock. Thus, clock cycles may be generated wherein the effective clock frequency is a non-integer multiple of the reference clock frequency. One drawback behind such an approach, however, is that the frequency is divisible by only $N+(K/X)$, wherein N is an integer, X is equal to the number of phase-shifted copies of the input clock and K is less than $X-1$. Furthermore, a finite-state-machine of moderate complexity is required to count clock cycles and control a clock selector multiplexer (MUX) that is associated with such an approach. Thus, the FFD design assumes computation of the cycle counting and MUX selection to be performed by the user or some other automatic means and input to the state machine.

Another FFD approach may be found in U.S. Pat. No. 5,970,110. Similar to the FFD of U.S. Pat. No. 6,157,694, phase-shifted copies of the input clock are directed to a counter/divider under the control of a state machine. Once again, this approach is limited to division by $N+(K/X)$. Moreover, this approach requires complex state-machine control and pre-computation of the cycle counting behavior. Furthermore, the approach of U.S. Pat. No. 5,970,110 requires frequency doubling and additional memory to function properly for cases where N is less than 2.

Accordingly, there exists a need in the industry for a system and method for a general programmable frequency generator or a general clock frequency divider.

SUMMARY

The present invention provides a system and method for dividing a reference clock signal by a real number, which allows for any desired degree of precision.

Briefly described, in architecture, one embodiment of the system comprises a reference clock operating at a given reference clock frequency, and a frequency-divider circuit configured to divide the reference clock frequency by a real number having an integer portion, a remainder portion, and an error portion. The error portion of the real number allows the system to divide the reference clock frequency by a real number having any desired degree of precision.

The present invention can also be viewed as a method for dividing a reference clock signal by a real number having any desired degree of precision. In this regard, one embodiment of such a method can be broadly summarized as including the steps of receiving a reference clock signal having a reference clock frequency, and dividing the reference clock frequency by a real number having an integer portion, a remainder portion, and an error portion. Again, the error portion of the real number allows for the division of the reference clock frequency by a real number having any desired degree of precision.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4A is a timing diagram showing the operation of the circuit of FIG. 3.

DETAILED DESCRIPTION OF DRAWINGS

Figure 1:
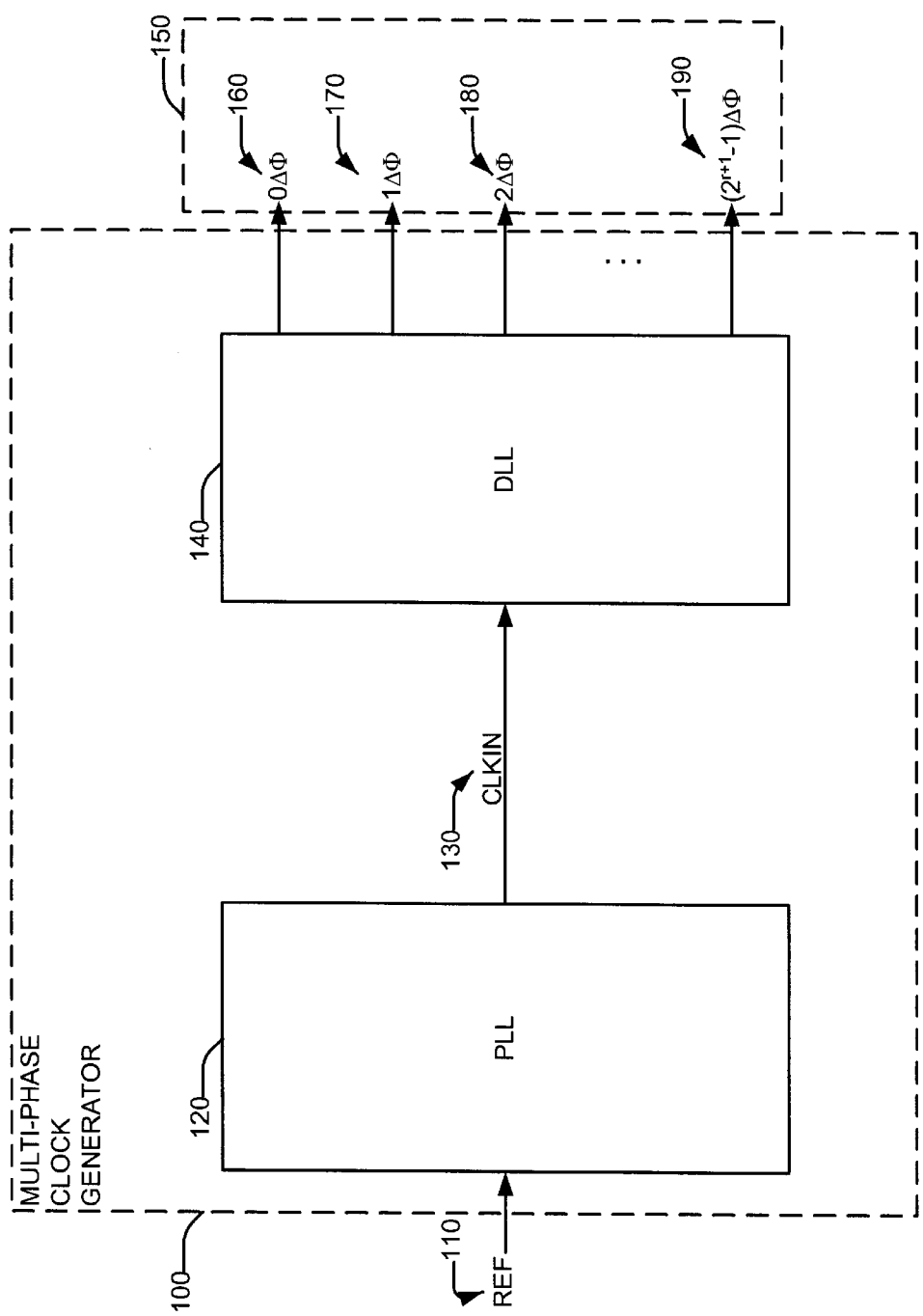
FIG. 1 is a block diagram showing a multi-phase clock generator configured to generate a finite number of clock signals from a reference clock signal.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

System

FIG. 1 is a block diagram showing a multi-phase clock generator 100 configured to generate a finite number of clock signals 150 from a reference clock signal 110. Since the generation of multiple clock signals is well known in the art, only a cursory description of an example system is provided here. In a general sense, the multi-phase clock generator 100 comprises a phase-locked loop (PLL) 120 and a delay-locked loop (DLL) 140, which are configured to produce a finite number of clock signals 150. The PLL 120 is configured to receive the reference clock signal 110 while a multi-tapped DLL 140 is configured to output a finite number of phase-shifted signals 150. In a preferred embodiment, the number of clock signals produced by the multi-phase clock generator 100 is a power of 2 and is related to an input divisor as described in detail below. Moreover, in the preferred embodiment, each of the generated clock signals 150 have the same frequency as the reference clock signal 110 and have a fifty percent duty cycle. Additionally, in the preferred embodiment, the phase difference between each adjacent phase-shifted clock 160, 170, 180, 190 is equal. In other words, the phase shift between the first generated clock signal 160 and the second generated clock signal 170 is the same as the phase shift between the second generated clock signal 170 and the third generated clock signal 180; the phase shift between the second generated signal 170 and the third generated clock signal 180 is the same as the phase shift between the last generated clock signal 190 and the first generated clock signal 160, etc. Thus, the phase shift between each adjacent clock signal is:

$$\frac{2\pi}{2^{r+1}} \qquad \text{[Eq. 1]}$$

or, in terms of time:

$$\frac{T}{2^{r+1}}, \qquad \text{[Eq. 2]}$$

wherein T is the clock period and r is related to the divisor, as described in detail below. While it is not necessary for the first generated clock signal 160 to be an exact replica of the reference clock signal 110, in the preferred embodiment, the first generated clock signal 160 has the same phase as the reference clock signal 110 and, therefore, is an exact replica of the reference clock signal 110, thereby simplifying the implementation of the clock divider circuit. This is shown below in FIGS. 2, 5, and 6.

Figure 2:
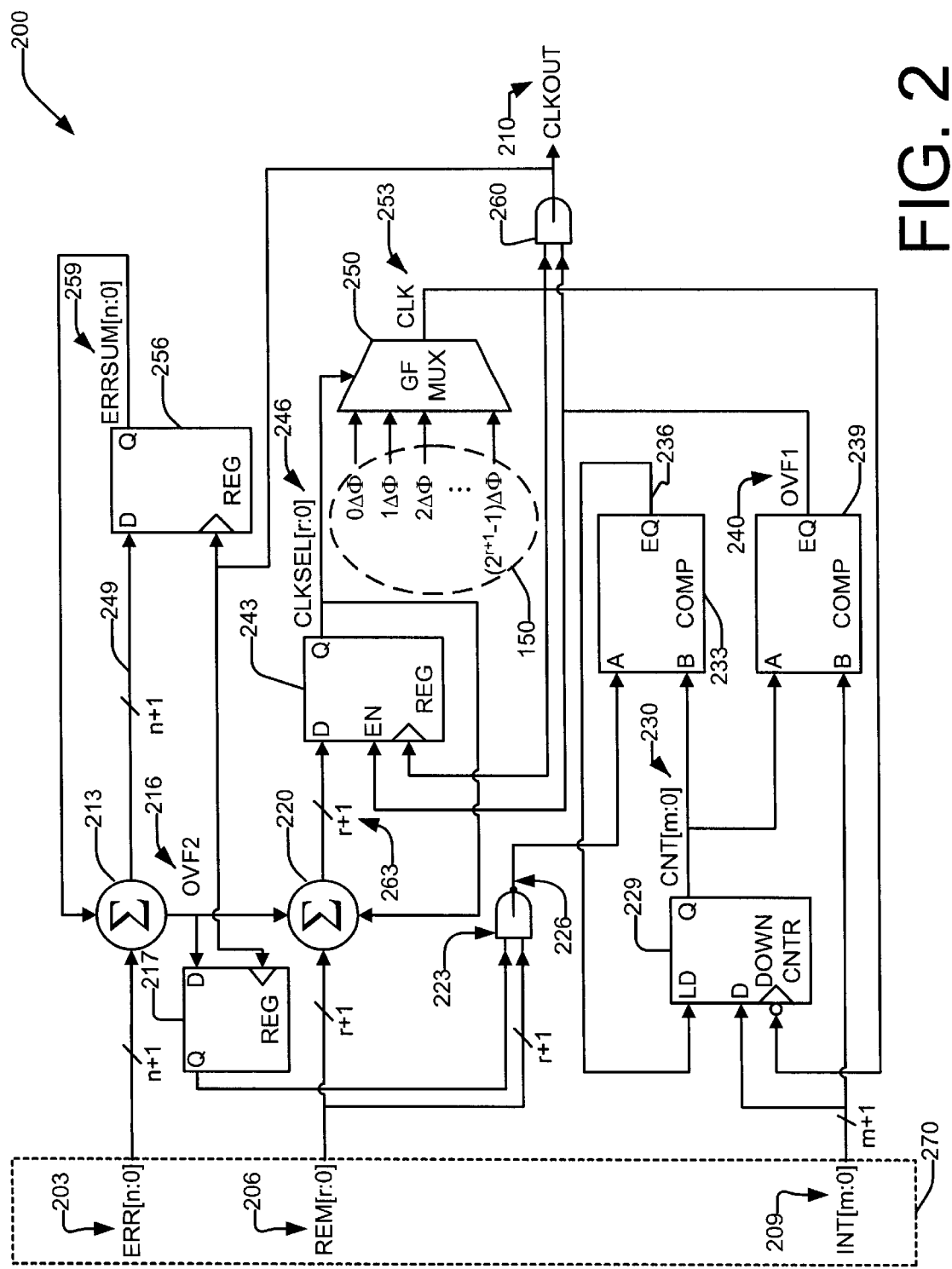
FIG. 2 is a circuit diagram showing one embodiment of the invention having a glitch-free multiplexer having, as its input, the finite number of clock signals of FIG. 1.

FIG. 2 is a circuit diagram showing one embodiment of the invention comprising a glitch-free multiplexer 250 (hereinafter referred to as GF MUX 250), which is a device that is configured to select a clock signal from a plurality of clock signals with no glitches or short pulses. While the GF MUX 250 will be described below in greater detail, it is worthwhile to note here that a finite number of clocks 150 (FIG. 1) is input to the GF MUX 250, and the GF MUX 250 selects one of the finite number of clocks 150 thereby controlling, to some extent, the resolution of the final clock output 210 (hereinafter referred to as CLKOUT 210). In this non-limiting embodiment, a digital frequency divider circuit 200 (hereinafter DFD circuit 200, or simply DFD 200) has a clock output 210 and a real number input 270. The real number input D 270 (hereinafter referred to as real number 270 or D 270) is separated into three parts. The first part is an integer portion 209 (hereinafter referred to as INT[m:0] 209), which reflects the whole number integer associated with D 270. The other two parts, the remainder portion 206 (hereinafter referred to as REM[r:0] 206) and the error portion 203 (hereinafter referred to as ERR[n:0] 203), reflect the fractional portion of D 270. In other words, REM[r:0] 206 and ERR[n:0] 203 reflect the digits to the right of a decimal point to a given degree of precision. For example, if the real number in base-10 or decimal is $3.421875_{10}$, which is $11.011011_2$ in base 2 or binary, then INT[m:0] 209 would reflect the decimal "3" or binary "11" before the decimal point, and the combined values of REM[r:0] 206 and ERR[n:0] 203 would reflect the decimal "421875" or binary "011011" after the decimal point.

Since, in the preferred embodiment, the number of clock signals is represented by the denominator of Eqs. 1 and 2, it is worthwhile to describe the relationship between the three parts of D 270 and the generated clock signals 150 in order to provide a context for the circuit components within DFD 200. As stated earlier, the number of generated clock signals (also referred to as phase-shifted clock signals) 150 is related to r. In the preferred embodiment, r is indicative of the number of bits associated with REM[r:0] 206 of D 270. Specifically, r is one less than the number of binary digits used to represent the remainder portion REM[r:0] 206. Using the example binary number $11.011011_2$ from above, which has six bits after the decimal point (i.e., the "011011" bits), if REM[r:0] 206 is defined by three bits, then r would equal 2, and the number of phase-shifted clocks 150 would be 8 (i.e., $2^{r+1}=2^{2+1}=2^3=8$). Thus, the first three bits beyond the decimal point (i.e., the first "011") would be the remainder portion REM[r:0] 206 while the following bits (i.e., the rest of the bits "011") would be the error portion ERR[n:0] 203 of the real number D 270. Stated differently, for the given example $11.011011_2$, the real number D 270 would be represented by INT[1:0], REM[2:0], and ERR[2:0], wherein INT[1:0]=11, REM[2:0]=11, and ERR[2:0]=011.

Having described INT[m:0] 209 (e.g., "11"), REM[r:0] 206 (e.g., "011"), and ERR[n:0] 203 (e.g., "011") of D 270, a non-limiting example DFD circuit 200 may be described with reference to these three portions of the divisor D 270. While individual circuit components will be described in detail below, it is worthwhile to examine the DFD circuit 200 as a whole to see the generation of the desired $$\frac{1}{D}$$

clock signal 210 (i.e., CLKOUT 210) from INT[m:0] 209, REM[r:0] 206, and ERR[n:0] 203.

The DFD circuit 200 may be seen as comprising three major sections, each of which correspond to the three portions of the real number divisor D 270. In the first section, INT[m:0] 209 is used by a down counter 229 to count down from INT to 1 (or alternatively 0 as described below), thereby controlling the integer division of the reference clock signal 110 (FIG. 1) by INT[m:0] 209. Once the integer portion has been "counted down," the rest of the circuit triggers to select the decimal portion (i.e., the non-integer portion as represented by REM[r:0] 206 and ERR [n:0] 203). In these sections, a clock-select-register 243 (hereinafter referred to as CLKSEL-register 243) produces a clock-select signal 246 (hereinafter referred to as CLKSEL [r:0] 246) that determines which of the finite number of phase-shifted clock signals 150 should be chosen to result in the "best approximation" of the desired divided frequency. In essence, by advancing the selected phase, additional time is added to the current clock period, thereby changing the frequency. This is done by the GF MUX 250, which has, as its input, the finite number of clock signals 150 that were generated by the multi-phase clock generator 100. In this manner, a period of time equal to the reference clock period multiplied by INT[m:0] 209 plus a fractional portion equal to the reference clock period multiplied by REM[r:0] 206 is demarcated. At this point, since the finite number of clock signals 150 only has the phase resolution as defined by the r-bits of REM[r:0] 206, the system may only approximate the desired divided frequency to a precision of $$\frac{1}{2^{r+1}}.$$

Thus, if the divisor has any non-zero ERR[n:0] 203 bits, then an exact frequency division by D 270 may not be obtainable. The last section of the DFD circuit 200 corrects for this potential discrepancy by accumulating ERR[n:0] 203 through subsequent CLK 253 outputs.

If ERR[n:0] 203 exists, then the ERR[n:0] 203 is added to the error-accumulation register 256 (hereinafter referred to as ERRSUM-register 256), which accumulates the propagated error until ERRSUM[n:0] 259 either exceeds or equals the resolution of REM[r:0] (i.e., until ERRSUM[n:0] becomes great enough that it may be seen as a phase shift to the next clock phase). In other words, once a sufficient error has accumulated so that the next clock phase may be selected, this accumulated error ERRSUM[n:0] 259 triggers the CLKSEL-register 243 to select the next phase-shifted clock signal 150 rather than the clock signal 150 that would normally be selected, thereby compensating for all of the accumulated error ERRSUM[n:0] 259 in a single iteration. The system repeats this process of accumulating the errors and compensating for the accumulated error, thereby producing an average clock signal that is $$\frac{1}{D}$$

times the reference clock signal 110 (FIG. 1). While the DFD circuit 200 has been described as having three sections, these three sections are intertwined with one another to form a whole that is configured to produce an average frequency that is $$\frac{1}{D}$$

times the reference clock signal 110 (FIG. 1). Reference is made to the various components of the DFD circuit 200 to better enable one of ordinary skill in the art to make and practice the invention.

During initialization, all of the registers 256, 243 and the counter 229 are cleared (or reset). Additionally, all inputs INT[m:0] 209, REM[r:0] 206, and ERR[n:0] 203 are initialized to appropriate values to reflect D 270. Once the system has been initialized, INT[m:0] 209 is input to a down counter 229 as well as an overflow comparator 239 (hereinafter referred to as OVF1-comparator), which is configured to compare INT[m:0] 209 with the down-counter output 230 (hereinafter referred to as CNT[m:0] 230). The down-counter 229 is configured to receive INT[m:0] 209 and count down from INT to 1 (or alternatively 0 as described below) responsive to the falling edge of the output of GF MUX 250 (hereinafter referred to as CLK 253), thereby keeping track of the integer portion of the frequency division. CNT[m:0] 230 is also input to another comparator (hereinafter CNT-comparator 233), which is configured to trigger the down counter 229 so that INT[m:0] 209 is once again loaded when the count has been depleted. In other words, when the count has gone from INT to 1 (or alternatively 0 as described below), CNT-comparator 233 signals down counter 229 to reload the integer count INT[m:0] 209 on the next falling edge of CLK 253, thereby repeating the clock division procedure. The CNT-comparator 233 has, as its inputs, the CNT[m:0] 230 output from the down counter 229 and an input of 0 or 1 which is determined by the output 226 (hereinafter referred to as NAND output 226) from a NAND gate 223, which will be further discussed below. Thus, the down counter 229, the OVF1-comparator 239, and the CNT-comparator 233 are configured to track the integer portion of the real number D 270 and reset the down-counter 229 when the system has counted down the appropriate number of full integer clock cycles, which will equal INT or INT+1, the latter being a special case when REM[r:0] is maximum as described below.

In addition to INT[m:0] 209, after initialization of the DFD circuit 200, REM[r:0] 206 is input to the NAND gate 226 and a summer circuit (hereinafter referred to as REM-summer 220). REM-summer 220 is a modulo $2^{r+1}$ adder such that summations greater than or equal to $2^{r+1}$ result in an output that equals the sum minus $2^{r+1}$ (e.g., in a modulo 8 adder 7+7=14 which is greater than 8 so the output is 14−8=6). The REM-summer 220 is configured to receive REM[r:0] 206, the output of the CLKSEL-register 243 and a carry-input bit from the error summation (as described below) and stores the sum of these inputs in CLKSEL-register 243 at the rising edge of CLK 253 when enabled by the output of the OVF1-comparator 239. Therefore CLKSEL-register 243 is updated on the rising edge of CLK 253 immediately after a falling edge on CLK 253 during which the OVF1-comparator 239 output signals that CNT [m:0] 230 is equal to INT[m:0] 209 (i.e. the down-counter 229 has been loaded with INT[m:0] 209). The CLKSEL-register 243 holds the clock-select signal (hereinafter referred to as CLKSEL[r:0] 246), which is used to select one of the finite number of clock signals 150 by the GF MUX 250. CLKSEL[r:0] 246 is also fed back to the REM-summer 220. GF MUX 250 is configured to receive CLKSEL[r:0] and the finite number of clock signals 150 from the multi-phase clock generator 100, and select one of the finite number of clock signals 150 as its output CLK 253 depending on the received value of CLKSEL[r:0] 246. Thus, the REM-summer 220, the CLKSEL-register 243, and the GF MUX 250 are configured to advance the phase of CLK 253 by $$\frac{2\pi \times REM[r:0]}{2^{r+1}}$$

once for every complete count down of down-counter 229, thereby effectively extending the period of one cycle of CLK 253 by $$\frac{T \times REM[r:0]}{2^{r+1}}$$

for every INT[m:0] cycles of CLK 253. REM-summer 220, CLKSEL-register 243, and GF MUX 250 provide control of the frequency division up to a resolution of $$\frac{1}{2^{r+1}}.$$

Thus, when CLK 253 and OVF1 240 are input to an AND gate 260, the output CLKOUT 210 is a clock signal having a frequency $$\frac{1}{D'}$$

of the reference frequency, wherein D' is a truncated divisor having a precision determined by REM[r:0] 206. For example, if D=11.01 $1011_2$, INT[1:0]=11, REM[2:0]=011, and ERR[2:0]=011, then D'=11.$011_2$. If there is any discrepancy between the truncated D' and D 270, then the remaining portion of DFD circuit 200 adjusts for this discrepancy, thereby allowing for an exact frequency division. After initialization, the ERR[n:0] 203 is input to an error summer circuit 213 (hereinafter ERR-summer 213). ERR-summer 213 is a modulo $2^{n+1}$ adder. The carry or overflow output of ERR-summer 213 (hereinafter referred to as OVF2 216) is relayed to the REM-summer 220 and the result is stored in an error-sum register (hereinafter ERRSUM-register 256). The ERRSUM-register 256 is configured to store the output of ERR-summer 213 in response to a rising edge on CLK-OUT 210 and produce an accumulated error (hereinafter referred to as ERRSUM[n:0] 259). The ERRSUM[n:0] represents an accumulation of the discrepancy between D 270 and D'. Thus, if ERR[n:0] 203 is non-zero, then, at each subsequent rising output of CLKOUT 210, the discrepancy between D 270 and D' increases until ERR-summer 213 produces a carry output on OVF2 216, which is relayed to REM-summer 220. OVF2 216 signals that the accumulated error has exceeded the resolution of the lowest REM[r:0] 206 bit. In other words, as ERRSUM[n:0] 259 accumulates over time, sooner or later ERRSUM[n:0] 259 will become greater than $$\frac{1}{2^{r+1}}.$$

At this point, OVF2 216 increases the output of REM-summer 220 by one more than usual which will cause CLKSEL register 246 to select the next phase-shifted clock signal 150, thereby compensating for all of the accumulated phase error. For example, although the GF MUX 250 would normally select the 1ΔΦ clock 170 (FIG. 1) for a given circumstance, if ERRSUM[n:0] 259 exceeds $$\frac{1}{2^{r+1}},$$

then GF MUX 250 would select the 2ΔΦ clock 180 (FIG. 1), thereby compensating for accumulated discrepancies and, hence, producing an average clock signal having a frequency that is $$\frac{1}{D}$$

of the reference frequency.

OVF2 216 is also stored in flip-flop 217 on the rising-edge of CLKOUT 210. The output of flip-flop 217 is input to the NAND gate 223 along with the REM[r:0] 206 bits. This is necessary to deal with the special case when REM[r:0] 206 is at the maximum value $2^{r+1}-1$ (i.e. all 1's). When this is true, a carry-out on OVF2 216 will cause REM-summer 220 output to be unchanged due to the result from modulo addition that CLKSEL[r:0] 246 added to $2^{r+1}$1 plus 1 simply equals CLKSEL[r:0] 246. This means that the next selected clock phase should shift a complete reference clock period T, which is equivalent to counting down the integer portion one additional cycle. Therefore, when this is the case, the output of NAND gate 223 causes the A-input of CNT-comparator 233 to equal 0 rather than the normal 1 and down-counter 229 counts down to 0.

Thus, as shown from FIG. 2, the DFD circuit 200 allows for division of a reference frequency 110 (FIG. 1) by a real number D 270, which may be defined to have any desired degree of precision, thereby generating a clock signal CLK-OUT 210 having an average frequency that is $$\frac{1}{D}$$

of the reference frequency 110 (FIG. 1).

Figure 3:
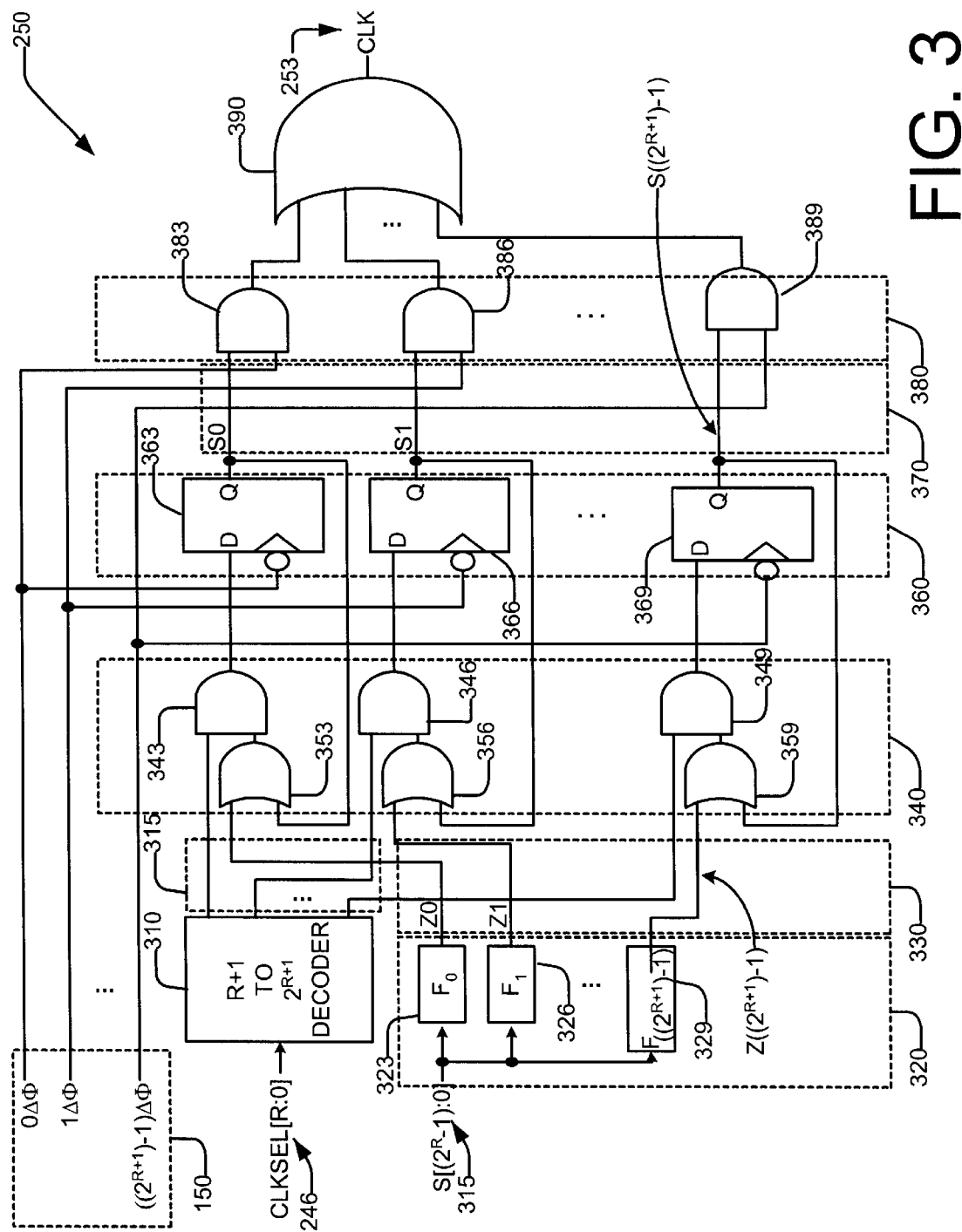
FIG. 3 is a circuit diagram showing the glitch-free multiplexer of FIG. 2 in greater detail.

FIG. 3 is a circuit diagram showing the glitch-free multiplexer (GF MUX) 250 of FIG. 2 in greater detail. While several different implementations of GF MUXs are known in the field, an improved GF MUX 250 is shown here, wherein the GF MUX 250 is configured as a "break before make" GF MUX 250. Thus, in this embodiment, the "break" is responsive to the falling edge of the last-selected clock CLK 253 and the "make" is responsive to the falling edge of the newly-selected clock from the finite number of clock signals 150. In a typical implementation, the signals labeled $Z[(2^{r+1}-1):0]$ 330 (hereinafter referred to as Zn-signal 330) are tied together (i.e. all Zn signals are identical) and equal the logical NOR of all of the $S[(2^{r+1}-1):0]$ signals 320 (hereinafter referred to as Sn-signals 370). Only one Sn-signal 370 is high at any given time such that only one input clock 150 is gated to the output CLK 253, however all Sn-signals must be low in a typical implementation in order for a new Sn-signal to be selected such that a change in CLKSEL[r:0] first results in all Sn being deselected followed by the new Sn-signal being selected. In this way, a "break" (i.e., all S-signals low) is forced to come before the "make" (i.e., the new S-signal high). There is, however, a limitation in this type of implementation when switching between clock phases with small phase differences. This is due to the feedback time that exists in calculating the Zn-signal 330. Since the old phase is deselected on the falling edge of the old clock and the new phase is selected on the falling edge of the new clock, if the calculation of the Zn-signal 330 takes a longer time than the time difference between these two phases, then the falling edge of the new clock is missed and proper functioning of the DFD ceases. This is avoided using the improved design of FIG. 3, which takes advantage of the fact that all clocks in the preferred embodiment are at the same frequency and have a fixed phase relationship.

Figure 4B:
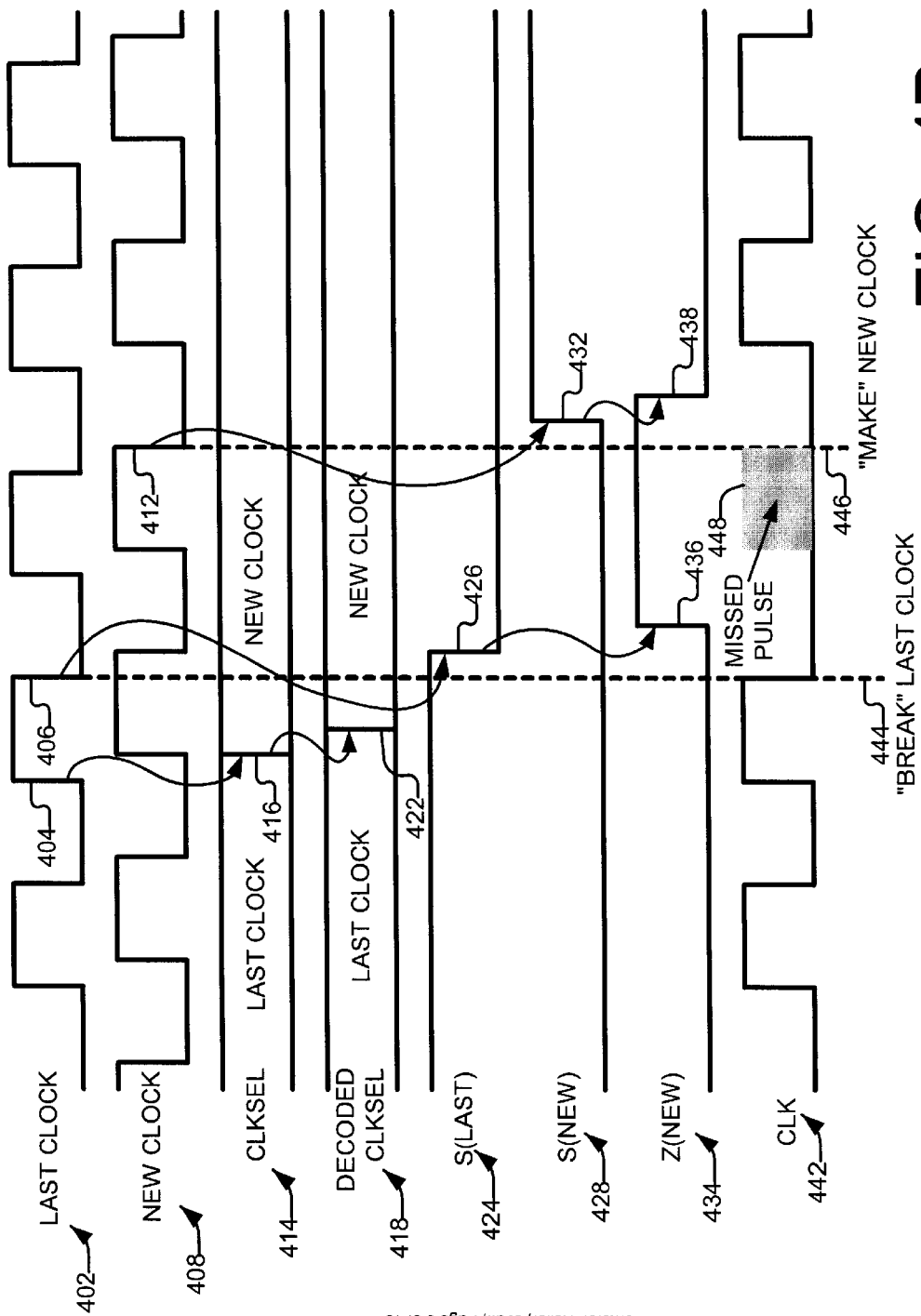
FIG. 4B is a timing diagram showing an operation of a MUX from the prior art.
Figure 4C:
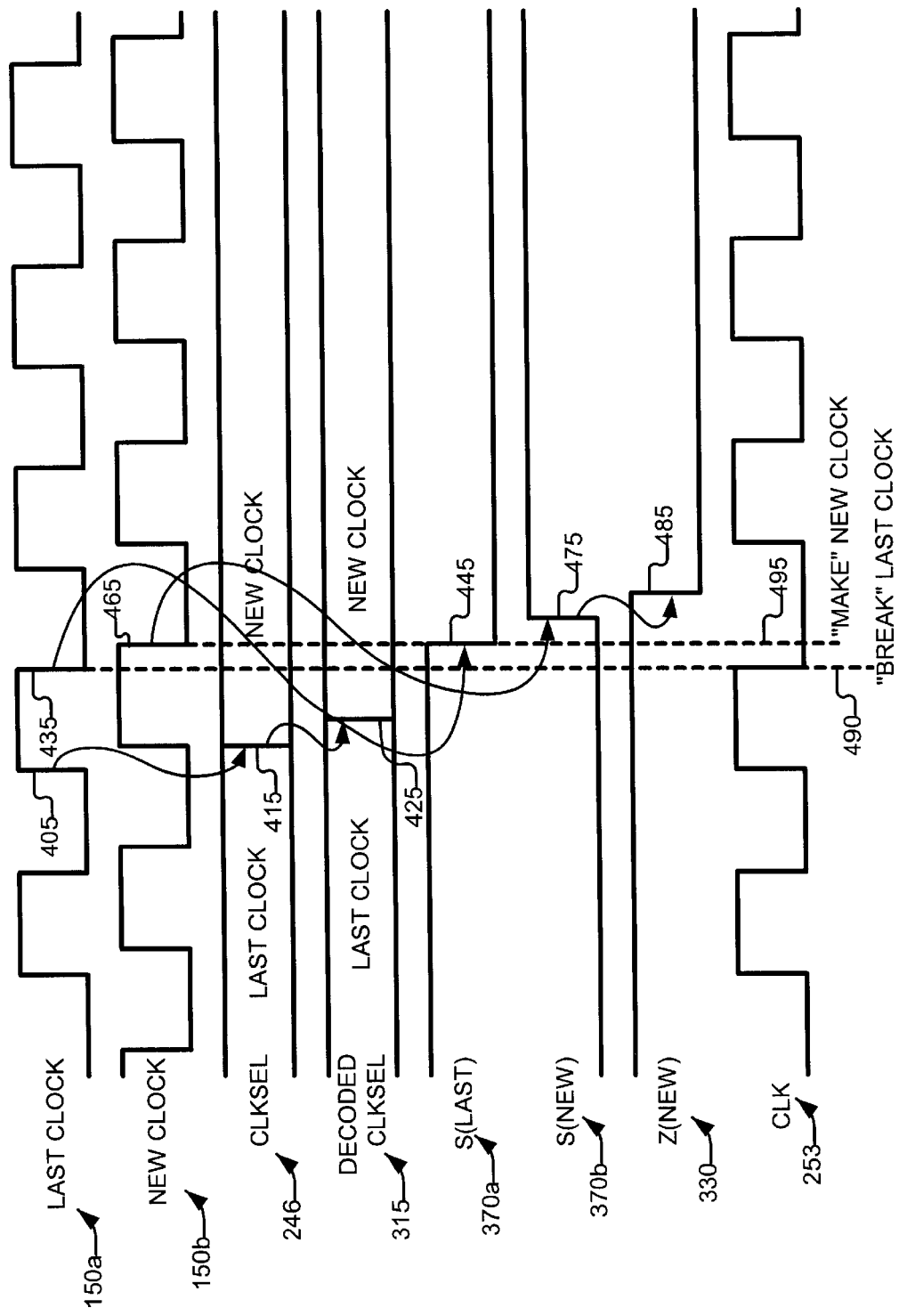
FIG. 4C is a timing diagram showing the operation of the circuit of FIG. 3, which is configured to compensate for the deficiency manifest in the timing diagram of FIG. 4B.

By generating each individual Zn-signal 330 via independent functions Fx 323, 326, 329 (x=0 to $2^{r+1}-1$), the zero condition can be calculated only from the select $S[2^{r+1}-1:0]$ signals 320 for clock phases that do not closely lead the newly-selected phase (i.e., from a subset of the Sn-signals 320 rather than all of them). For example, if 0ΔΦ 160 (FIG. 1) closely leads 1ΔΦ 170 (FIG. 1) then Z1 equals the NOR function of S1, S2, S3, S4, . . . ,$S(2^{r+1}-1)$. As shown from FIG. 3, the GF MUX 250 therefore allows for selection of one of the finite number of clock signals 150 as a function of the CLKSEL[r:0] 246 signal. An example of a timing diagram for such a circuit is shown in FIGS. 4A, 4B, and 4C.

FIG. 4A is a timing diagram showing the operation of the circuit of FIG. 3 in which operation is identical to that of the prior art. In order to simplify the explanation of the GF MUX 250 (FIG. 3) operation, only a few relevant signals for one example operation of the GF MUX 250 (FIG. 3) are shown with reference to FIG. 4A. These signals include CLK 253, which represents the output clock signal; a last clock 150a signal, which represents the clock signal prior to switching to another clock signal; a new clock 150b signal, which represents the clock signal to which the system has switched; CLKSEL 246, which represents the clock select signal that is generated from the flip-flop 243 (FIG. 2); a decoded-CLKSEL 315 signal, which is generated from the decoder 310 (FIG. 3) and lags the CLKSEL 246 by a delay time attributable to the calculation time; and S(last) 370a, S(new) 370b, and Z(new) 330, which are used in the generation of the CLK 253 signal. As explained with reference to FIG. 3, the GF MUX 250 is configured to "break" the last clock signal prior to the "make" of the new clock.

As can be seen from FIG. 4A, the CLKSEL 246 signal is responsive to the rising edge 405 of the last clock 150a signal. This rising edge 405 of the last clock 150a triggers a change 415 for CLKSEL 246 between the last clock 150a and the new clock 150b. The CLKSEL 246 signal is input to the decoder 310 (FIG. 3), which produces the decoded-CLKSEL 315 signal in response to the change 415 in the CLKSEL 246. As shown in FIG. 4A, there is a delay between the change 415 in the CLKSEL 246 and a change 425 in the decoded-CLKSEL 315 due to the calculation time inherent in the decoder 310 (FIG. 3). The falling edge 435 of the last clock 150a triggers S(last) 370a to go low, and the falling edge of S(last) 370a further triggers the generation of Z(new) 330. Thus, in operation, the CLK 253 signal shows the "break" 490 in the last clock 150a at the falling edge 435 of the last clock 150a, and a generation of Z(new) 330 subsequent to the "break" 490.

In addition to the "break" 490 in the last clock 150a, the first falling edge 465 of the new clock 150b signal triggers S(new) 370b to go high. This, in turn triggers Z(new) 330 to go low. Thus, the CLK 253 signal shows the "make" 495 of the new clock 150b at the falling edge 465 of the new clock 150b in response to Z(new) 330, which was generated subsequent to the "break" 490 of the last clock 150a signal.

FIG. 4B illustrates the case where a conventional glitch-free MUX causes a failure in the operation of the DFD. Here, the new clock 408 has a small phase difference compared to the last clock 402 and the calculation of the Z(new) 434 signal is completed after the falling-edge of the new clock 408. Therefore, the new clock 408 is not selected until the next falling-edge, which causes a missed pulse 448 on the CLK 442 signal.

FIG. 4C illustrates how the limitation shown in FIG. 4B is overcome with the improved circuit of FIG. 3. In this case the Z(new) signal is a function of only a subset of the Sn signals 320. Specifically, the S(last) 370a signal is not included in the computation of Z(new) 330 (i.e. Z(new) 330 is the logical NOR of all Sn signals 320 except S(last) 370a). Therefore, Z(new) 330 is valid before S(last) goes low and the correct falling edge of new clock 150b causes S(new) 370b to go high. The pulse that was missed 448 (FIG. 4B) in the conventional illustration of the prior art is not missed in this improved implementation.

Figure 4D:
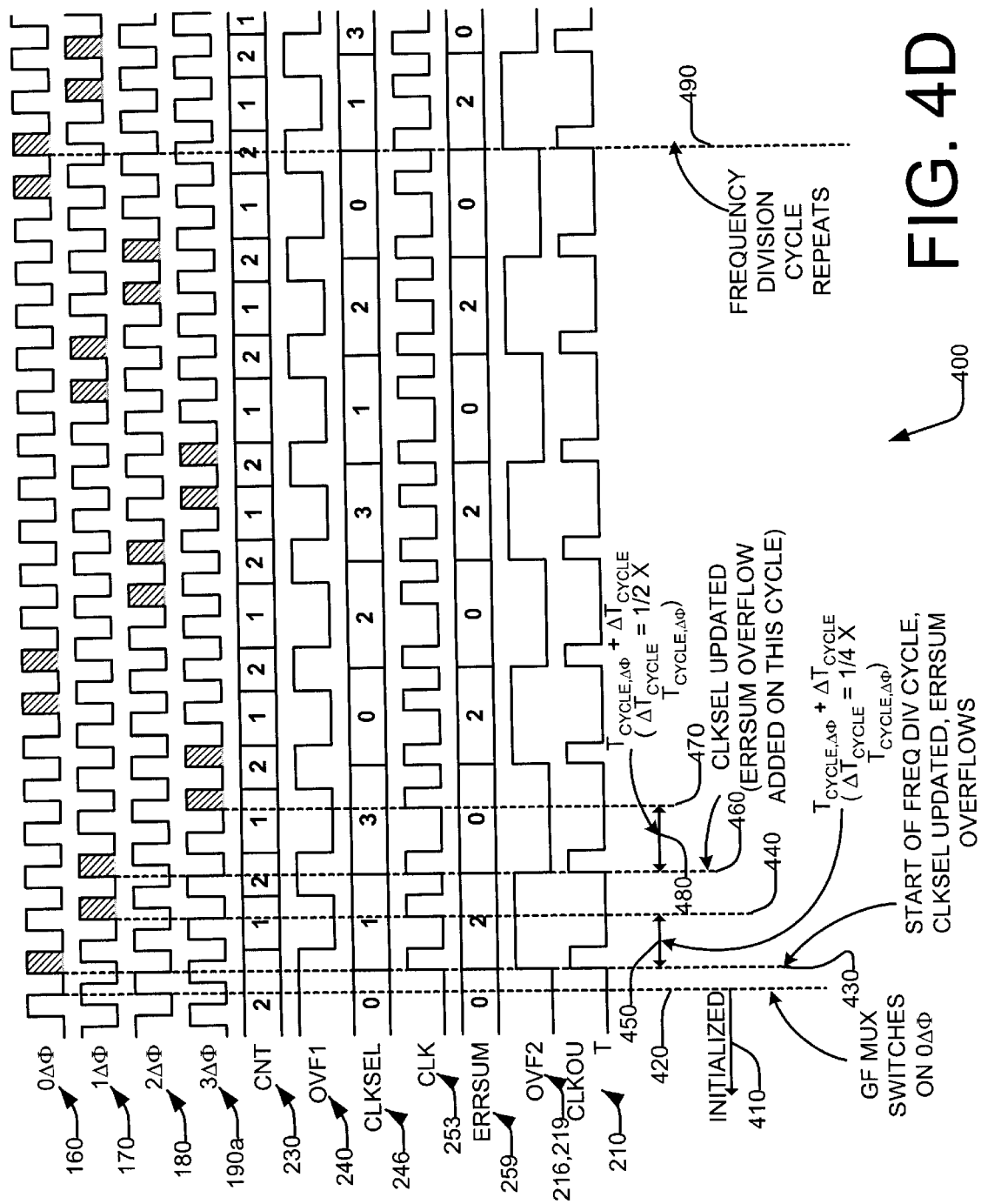
FIG. 4D is a timing diagram showing the operation of the circuit from FIG. 2.

FIG. 4D is a timing diagram showing the operation of the DFD circuit 200 from FIG. 2. In this non-limiting example m=1, r=1, n=1 and the divisor is $10.0110_2$ (or $2.375_{10}$). The DFD circuit 200 (FIG. 2) is initialized and stable prior to a falling clock edge on 0ΔΦ 160. The DFD circuit 200 (FIG. 2) is initialized by pre-loading the down counter 229 with INT[m:0] 209, clearing ERRSUM-register 259 to zero, clearing CLKSEL-register 243 to zero, and clearing GF MUX 250 (i.e., having no clock selected at GF MUX 250).

In the initialization state 410, CNT[m:0] is equal to INT[m:0] so that OVF1-comparator 239 causes OVF1 240 to be high. When OVF1 240 is high, CLK 253 is gated to CLKOUT 210 via the AND gate 260. After the first falling-edge 420 of 0ΔΦ 160, the GF MUX 250 drives 0ΔΦ onto CLK 253, so that the second pulse on 0ΔΦ 160 appears on CLK 253 and, therefore, CLKOUT 210. This marks the beginning of the frequency division cycle 430.

The down counter 229 (FIG. 2), OVF1-comparator 239 (FIG. 2), and CNT-comparator 233 are configured to continually count down from INT to 1 (until otherwise noted, this discussion assumes that OVF2 is in a low state so that the A-input to CNT-comparator 239 is equal to 1). The count is decremented by 1 on the falling edge of CLK 253. When CNT 230 reaches 1, CNT-comparator 233 causes the down counter 229 to be loaded with INT[m:0] 209 (FIG. 2) synchronously on the next cycle. When CNT 230 equals INT[m:0] 209 (FIG. 2), OVF1-comparator 239 causes OVF1 240 to go to a high state, which, as previously described, gates CLK 253 to CLKOUT 210 via AND gate 260 (FIG. 2). This effectively counts the integer portion of the divisor D 270.

The fractional portion of the divisor represented by REM [r:0] 206 (FIG. 2) is handled by the REM-summer 220, CLKSEL-register 243, and GF MUX 250. At the beginning of the frequency division cycle 430, REM[r:0] 206 (FIG. 2) is added to CLKSEL 246 and stored in CLKSEL-register 243 on the rising edge of CLK 253. Therefore, CLKSEL 246 is incremented by REM[r:0] 206 (FIG. 2). By the action of GF MUX 250 (FIG. 2) described above, CLK 253 is switched to a new input clock-phase 1ΔΦ 170 after the falling-edge of the last-selected clock 0ΔΦ 160 is followed by the falling edge of the newly-selected clock 1ΔΦ 170. In this manner, a time delay equal to the difference in phase between the newly-selected clock 1ΔΦ 170 and last-selected clock 0ΔΦ 160 is added to the clock period of CLK 253 for one cycle. This same time delay will also be added to the clock period of CLKOUT 210 during the next OVF1 240 gating.

In summary, the down counter 229 (FIG. 2) counts a number of CLK 253 cycles equal to the integer portion (i.e., INT[m:0] 209) of the divisor D 270. One of the CLK 253 clock cycles will be made longer through the action of the REM-summer 220, CLKSEL-register 243, and GF MUX 250. The added time delay of the long clock cycle is determined by REM[r:O] 206 (FIG. 2) and is calculated as:

$$\Delta t_{cycle} = \frac{REM}{2^{r+1}} \times T_{cycle,\Delta\Phi}. \quad [Eq.\ 3]$$

Therefore, the clock period between consecutive pulses on CLKOUT 210 is equal to a multiplication of input clock cycles ($T_{cycle,\Delta\Phi}$) by INT[m:0] 209 (FIG. 2) plus a fractional value $\Delta t_{cycle}$ as calculated above in Eq. 3:

$$T_{cycle,CLKOUT} = \left( INT + \frac{REM}{2^{r+1}} \right) \times T_{cycle,\Delta\Phi}. \quad [Eq.\ 3b]$$

This provides frequency division with a significantly less complicated hardware that does not require state-machines, complex memory, or variable calculation. Moreover, the resulting average output clock frequency is an exact division of the input clock frequency with no added jitter.

The timing diagram of FIG. 4D also illustrates the action of OVF2 216. When the ERR-summation 213 generates a carry-out at the start of the frequency division cycle 430 the OVF2 bit is stored in the flip-flop 217 at the beginning of the next CLKOUT cycle 460. This causes the next selected phase to be 3ΔΦ 190a rather than 2ΔΦ 180 at the CLKSEL update 470. This results in one CLKOUT 210 period equal to:

$$T_{cycle,CLKOUT} = \left( INT + \frac{(REM+1)}{2^{r+1}} \right) \times T_{cycle,\Delta\Phi}. \quad [Eq.\ 4]$$

The amount that the accumulated error exceeds $$\frac{1}{2^{r+1}}$$

is stored in ERRSUM register 256 and the error accumulation continues.

It should be noted that, in the REM-summer 220, any overflow can be ignored since the nature of the phase-shifted clock inputs is cyclical such that an (r+1)-bit binary modulo adder is sufficient to provide this function. It should further be noted that the pulse-width asymmetry of CLKOUT 210 is easily removed by placing a divide-by-two circuit after CLKOUT 210. In this case, the DFD circuit 200 divisor D 270 should be set to half of the desired value. Note that this is only valid for divisors that are originally greater than or equal to 2. Additionally, it can be seen that the DFD circuit 200 of FIG. 2 is unable to compensate for division by a repeating decimal $$\left( i.e.,\ a\ rational\ divisor\ such\ as\ \frac{10}{3} \right).$$

While these limitations are present within the specific embodiment described above, it will be clear to one of ordinary skill in the art that the DFD circuit 200 may be modified to remove such limitations. For example, the DFD circuit 200 of FIG. 2 may be modified to allow for division by a repeating decimal divisor 270 (FIG. 2), wherein ERR [n:0] 203 (FIG. 2) has an infinite (i.e., repeating) number of precision-bits. Two example circuits configured to allow such a division by a repeating decimal divisor 270 (FIG. 2) are shown in FIGS. 5 and 6.

Figure 5:
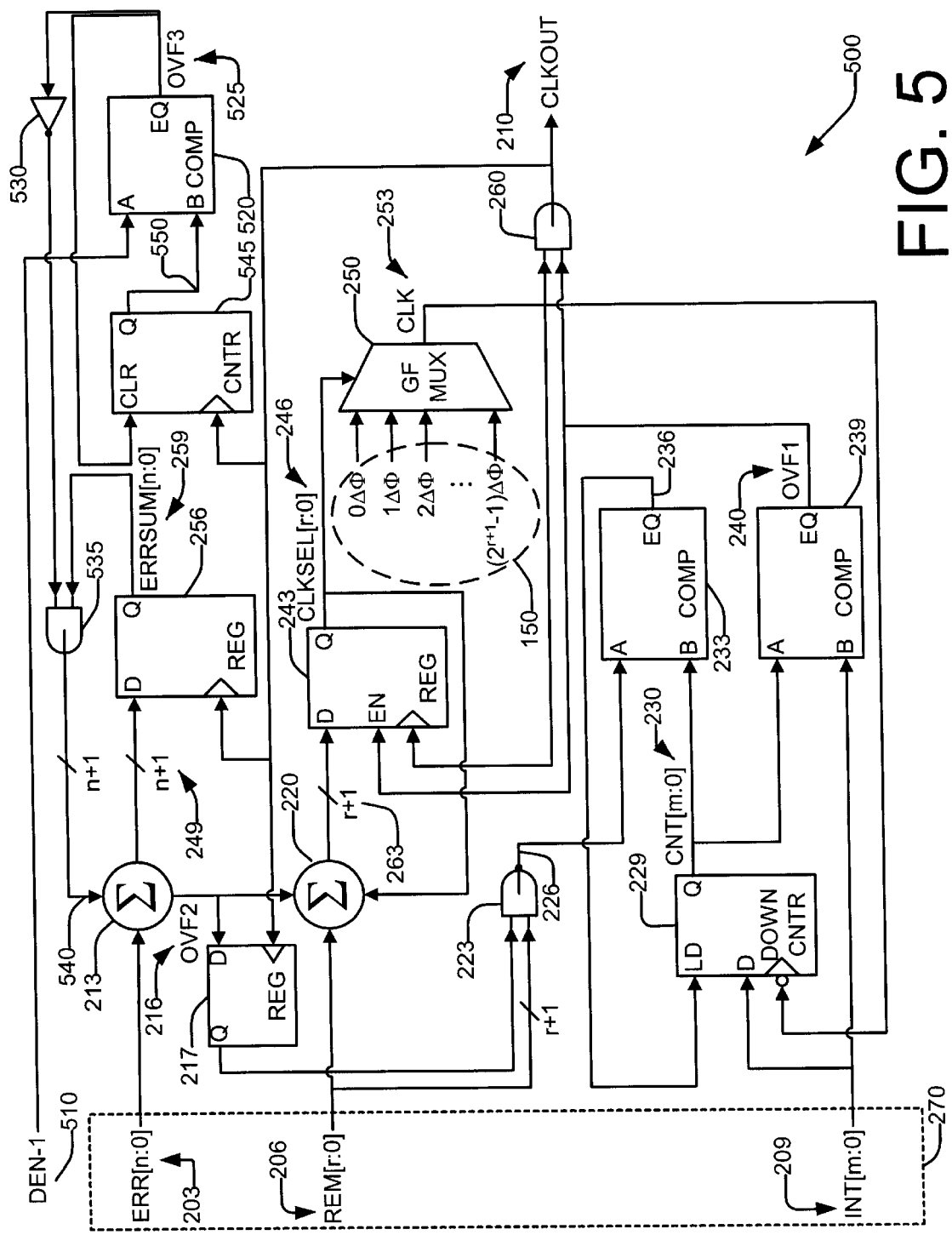
FIG. 5 is a circuit diagram showing another embodiment of the invention that is configured to divide the reference clock signal by a repeating decimal.
Figure 6:
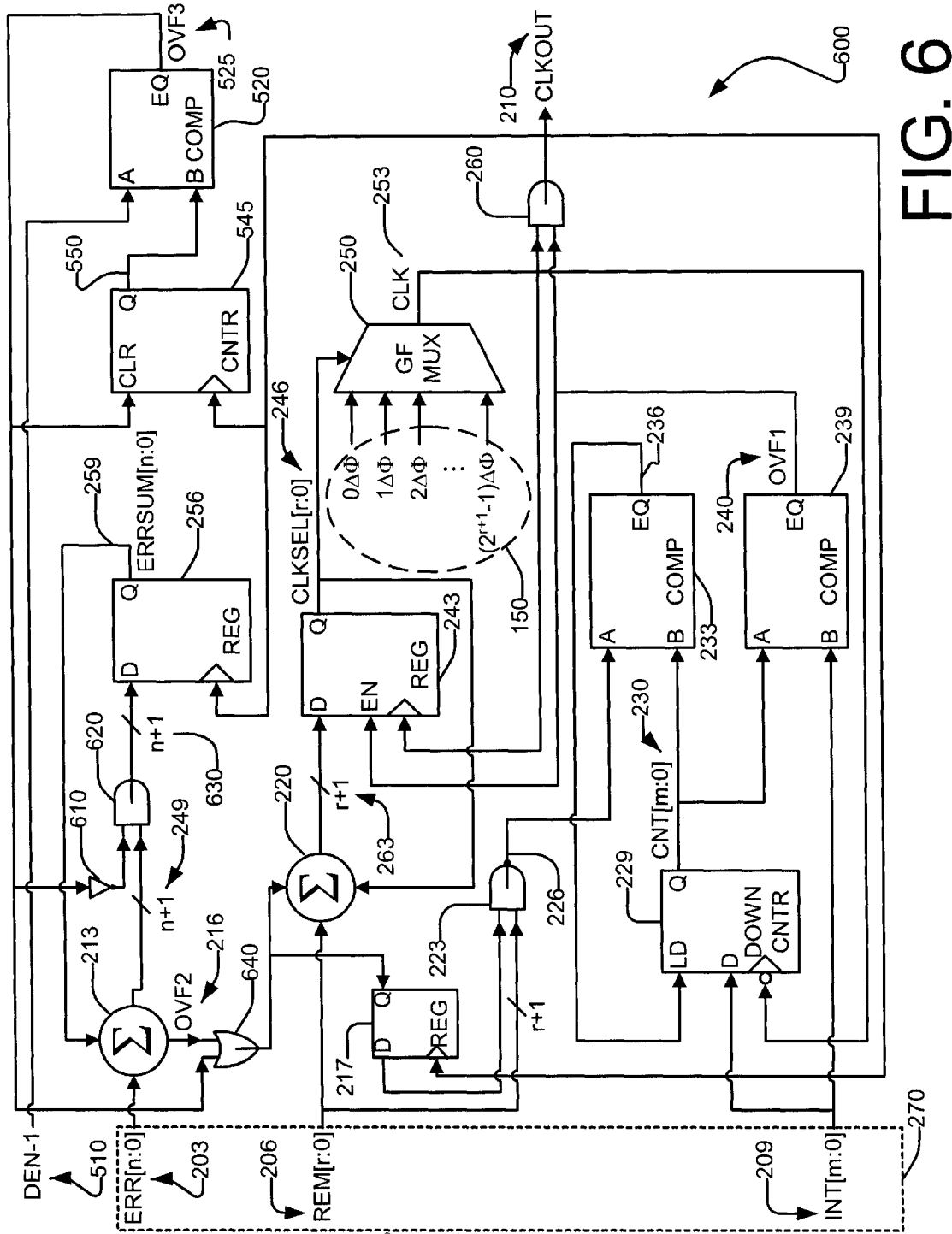
FIG. 6 is a circuit diagram showing an alternative embodiment of the invention that allows for division of the reference clock by a repeating decimal.

FIG. 5 is a circuit diagram showing one embodiment of the invention that is configured to divide the reference clock signal 110 (FIG. 1) by a repeating decimal. As shown in FIG. 5, the rational-divisor circuit 500 comprises the DFD circuit 200 (FIG. 2) with additional components, such as an input word DEN-1 510, an up counter 545, a comparator 520 (hereinafter referred togas OVF3-comparator 520) configured to produce an overflow OVF3 525, and an n+1 two-input AND-gate 535 having an inverted input 530. The up counter 545 is configured to repeatedly count from 0 to DEN-1 cycles of CLKOUT 210 synchronously with the positive edge of CLKOUT 210. When the count equals DEN-1, then the OVF3 525 output of OVF3-comparator 520 goes high causing the counter to synchronously clear to 0 on the next positive edge of CLKOUT 210. A high state on OVF3 525 also causes ERRSUM[n:0] 259 that is fed back to ERR-summer 213 to be zero.

In this sense, the embodiment of FIG. 5 functions as follows. If the divisor is a rational number with a repeating fractional portion (or a number having a precision greater than r+n binary digits), the divisor D 270 is truncated and a 1 is added in the least significant bit position (i.e., the truncated divisor is unconditionally rounded up). DEN-1 is set equal to one less than the denominator of the integer ratio equal to divisor D 270 (e.g., if $$D = \frac{10}{3},$$

then DEN-1 is set to 2). This guarantees that the ERRSUM [n:0] 259 will clear every DEN cycles of CLKOUT 210. This is the desired operation because if the precision of the ERR-summer 213 is unlimited, ERRSUM[n:0] 259 would equal zero after every DEN cycles. In this manners the error due to lack of precision is predictable and correctable using the embodiment as shown in FIG. 5.

FIG. 6 is a circuit diagram showing an alternative embodiment 600 of the invention, which allows for division of the reference clock signal 110 (FIG. 1) by a repeating decimal. This circuit 600 performs essentially the same function as the embodiment shown in FIG. 5. However the divisor 270 in FIG. 6 need not only be rounded up but, rather, may also be truncated or rounded down while still producing consistent behavior in the circuit 600. Since the additional circuit components of FIG. 6 are well known in the art and, also, since the other components have been described in detail with reference to FIGS. 2 and 5, no further discussion of FIG. 6 is included herein. However, it will be clear to one of ordinary skill in the art that the circuit 600 of FIG. 6 allows for division of a reference clock signal 110 (FIG. 1) by any real number divisor 270 that has a repeating decimal.

Figure 7:
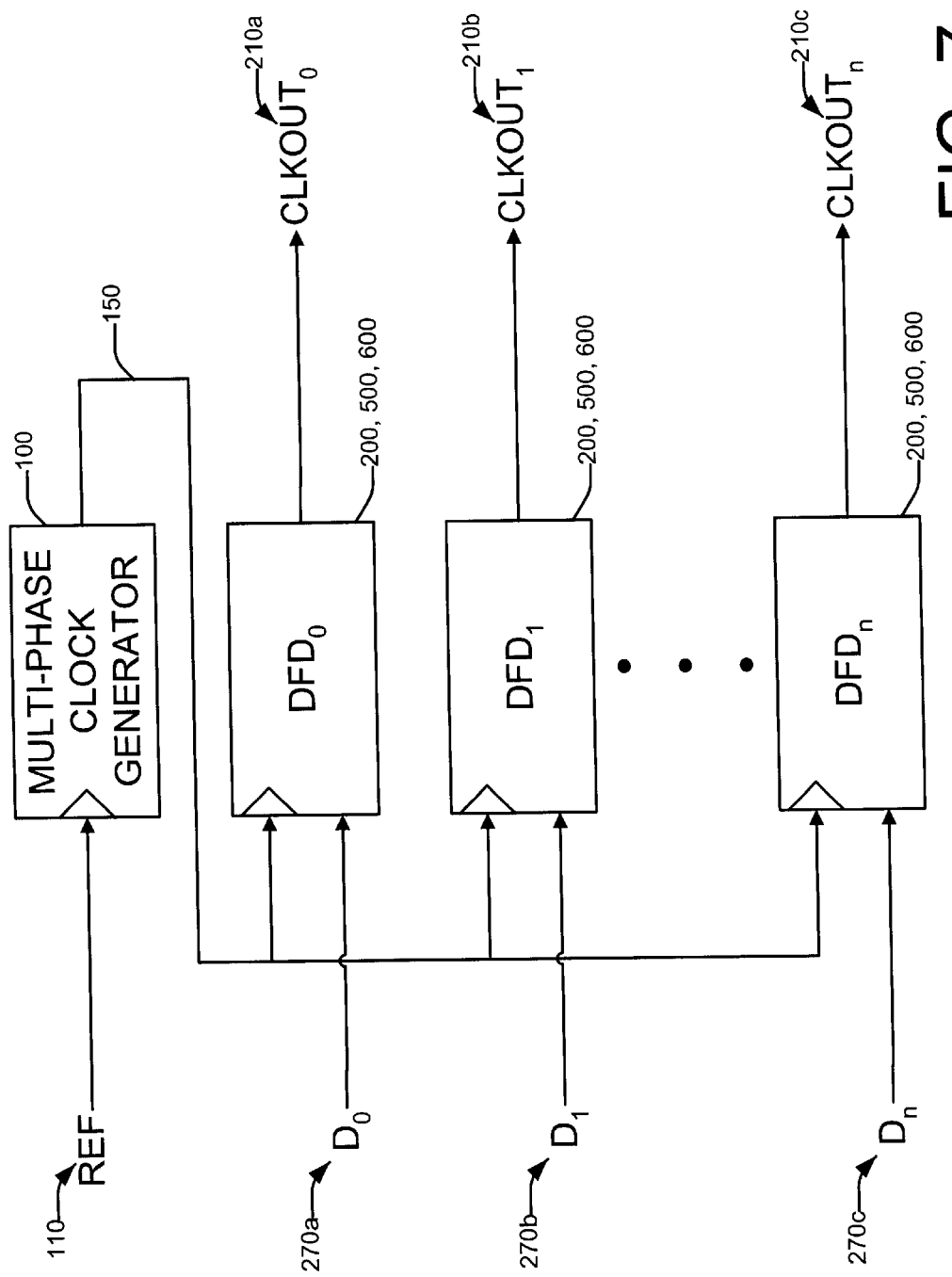
FIG. 7 is a circuit diagram showing multiple frequency-divided clocks.

FIG. 7 is a circuit diagram showing multiple frequency-divided clocks. While FIGS. 2, 5, and 6 show circuits 200, 500, 600 that are configured to perform a frequency division by any real number 270, these circuits 200, 500, 600 show the generation of only one divided clock (i.e., CLKOUT 210). FIG. 7 shows one embodiment of the invention wherein multiple DFD circuits 200, 500, 600 are connected in parallel to produce multiple divided clock signals CLKOUT$_0$ 210a, CLKOUT$_1$ 210b, . . . , CLKOUTn210c. Since each DFD circuit 200, 500, 600 has, as its input, a real number divisor 270 and the output of the multi-phase clock generator 100, it is possible to generate multiple divided clock signals CLKOUTn 210c by simply connecting the multi-phase clock generator 100 to a plurality of DFD circuits 200, 500, 600 and inputting different divisors 270a, 270b, 270c for division of the reference clock signal 110.

As shown in FIGS. 1 through 7, the DFD circuits 200, 500, 600 allow for frequency division of a reference signal 110 (FIG. 1) by any real number 290 (FIG. 2) having any degree of precision. Additionally, these circuits 200, 500, 600 allow for the frequency division with no added jitter, no complex state machines, and no added memory requirements.

Method

Figure 8:
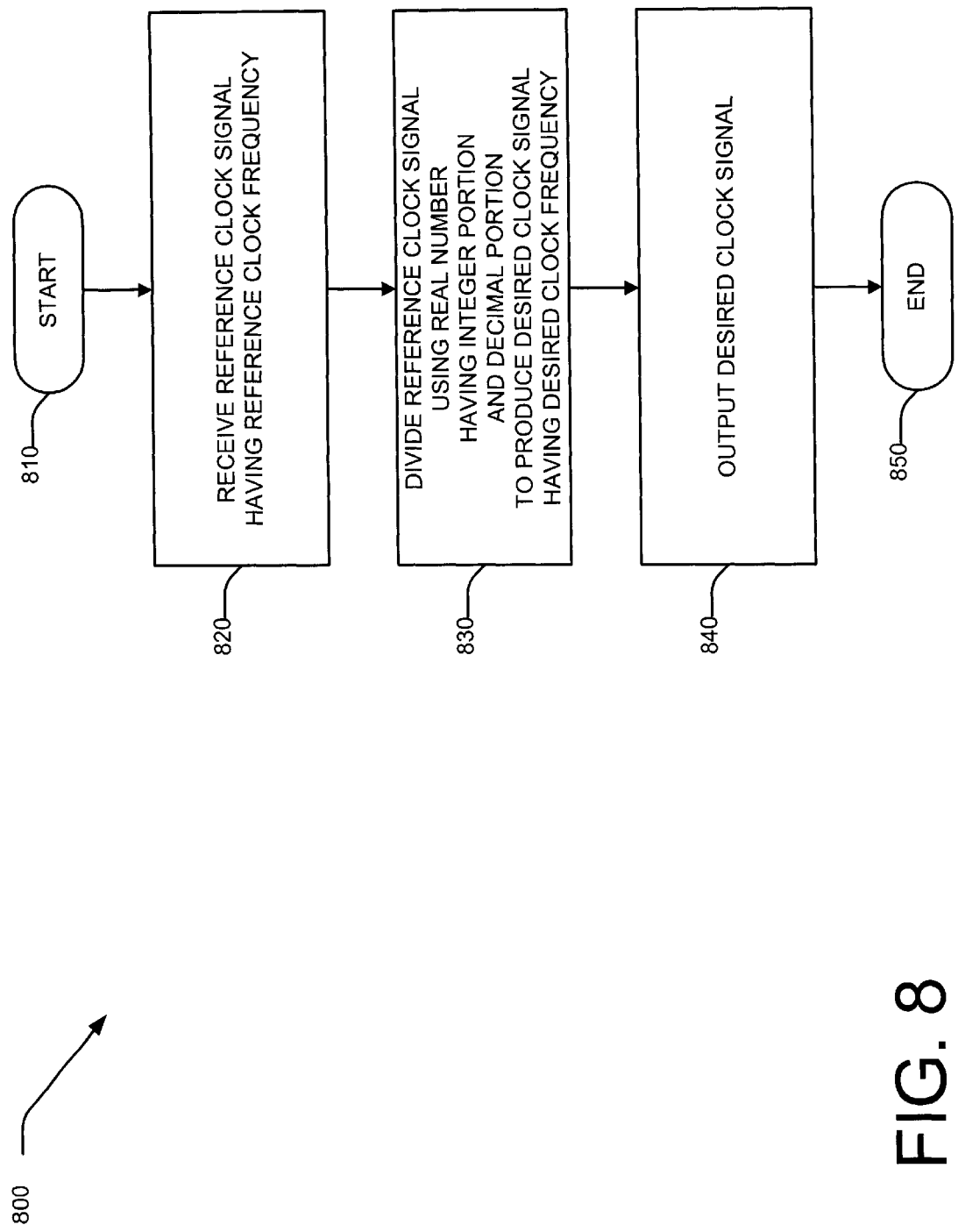
FIG. 8 is a flow chart showing one non-limiting example method associated with the clock divider circuit of FIGS. 2, 5, and 6.
Figure 9:
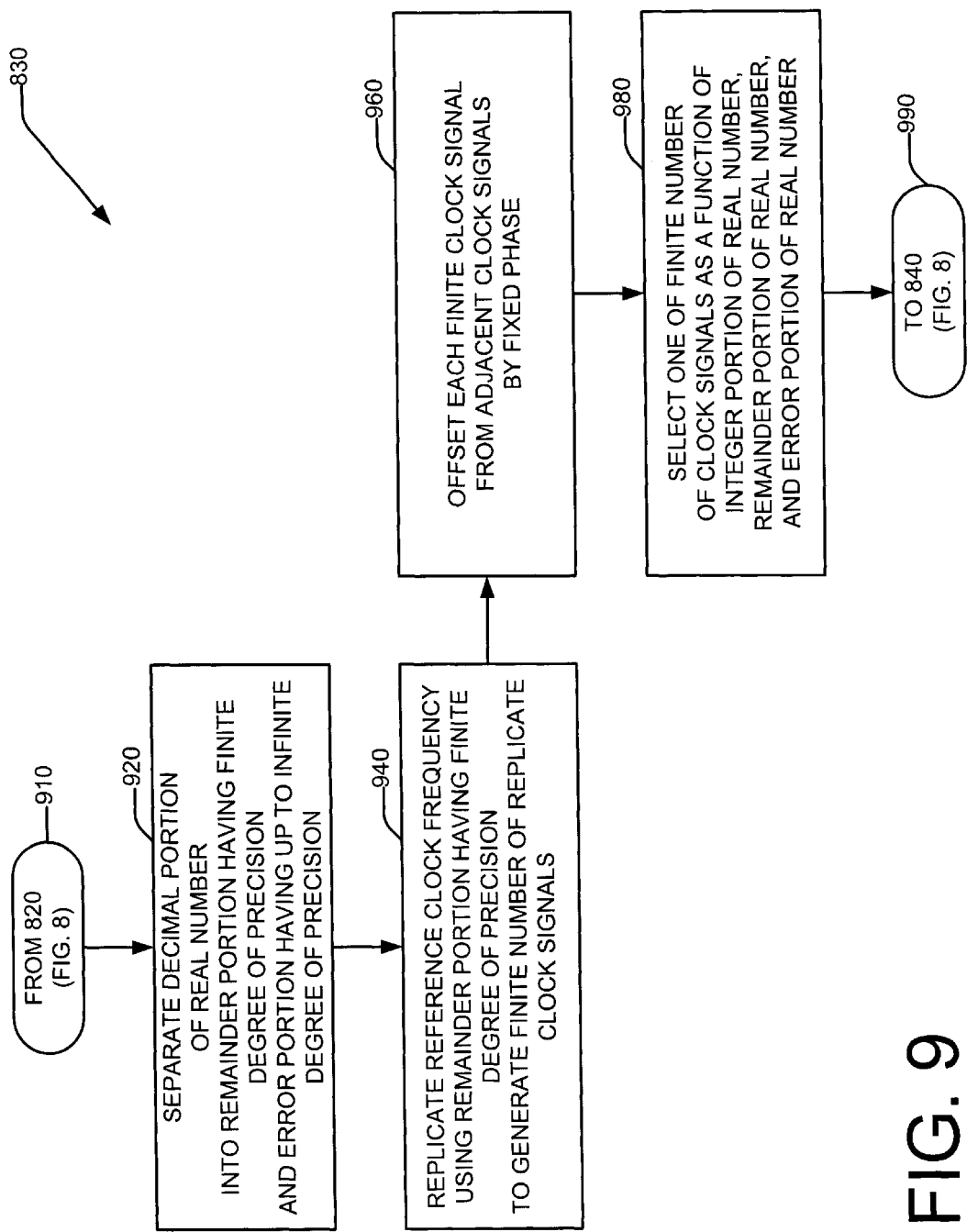
FIG. 9 is a flow chart showing the frequency-division step of FIG. 8 in greater detail.
Figure 10:
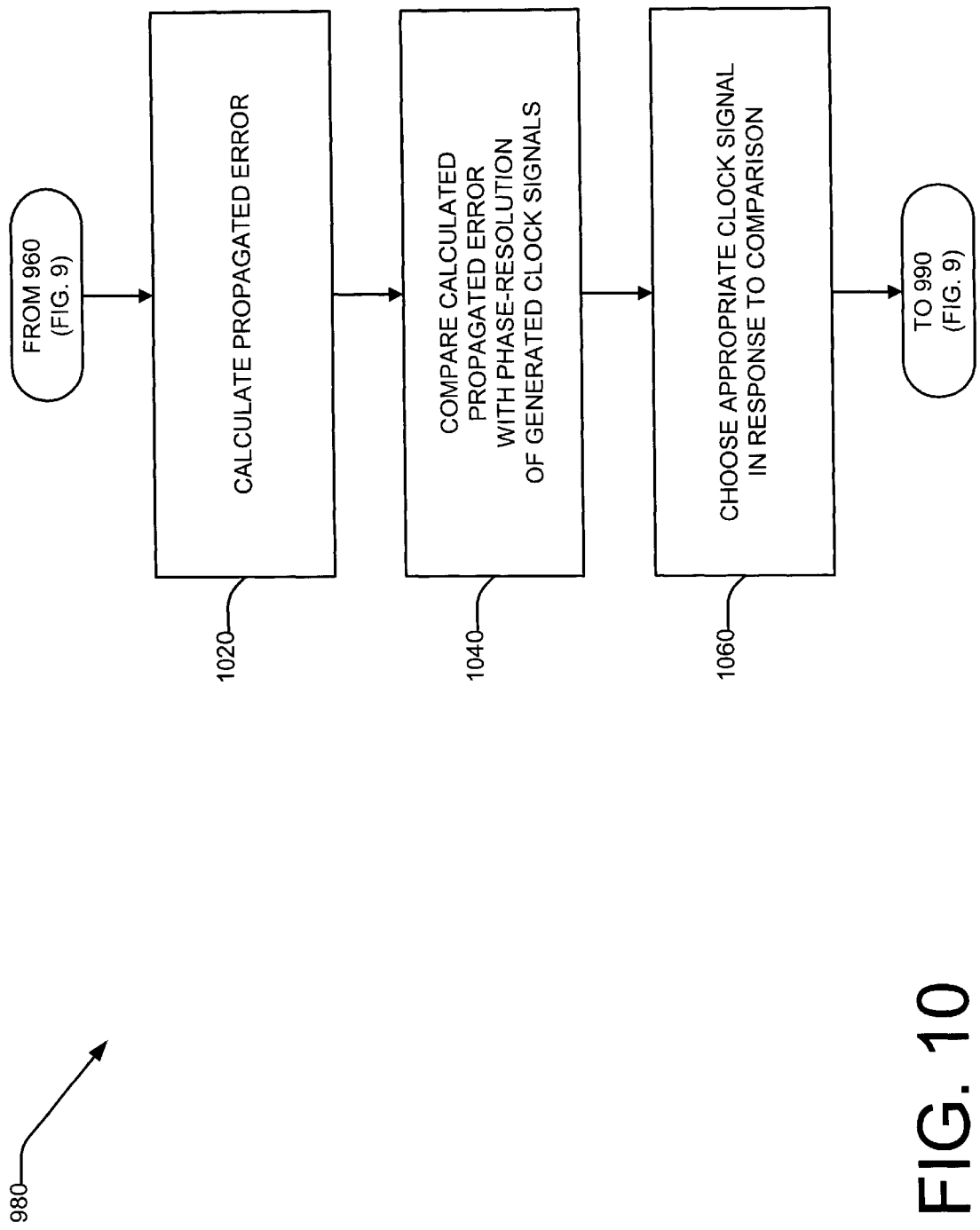
FIG. 10 is a flow chart showing the step of selecting one of the finite number of clock signals of FIG. 9 in greater detail.

Having discussed a non-limiting example of a system configured to divide a reference clock frequency by a real number having any desired degree of precision, a corresponding method is presented in FIGS. 8 through 10, which show a non-limiting method for dividing a reference clock frequency by a real number having any desired degree of precision.

FIG. 8 is a flow chart showing one non-limiting example method associated with the clock divider circuit of FIGS. 2, 5, and 6. In a broad sense, the method steps may be seen as receiving, in step 820, a reference clock signal 110 (FIG. 1) having a reference clock frequency at the inputs of a DFD circuit 200 (FIG. 2), and dividing, in step 830, the received 820 reference clock signal 110 (FIG. 1) by a real number D 270 (FIG. 2) having an integer portion (e.g., INT[m:0] 209 (FIG. 2)) and a decimal portion (e.g., REM[r:0] 206 (FIG. 2) and ERR[n:0] 203 (FIG. 2)), wherein the real number 270 (FIG. 2) may have any degree of precision. Once the DFD circuit 200 divides 830 the reference clock signal 110 (FIG. 1), the DFD circuit 200 (FIG. 2) outputs, in step 840, a desired clock signal (e.g., CLKOUT 210 (FIG. 2)) having an average clock frequency that is $$\frac{1}{D}$$

of the reference clock frequency 110 (FIG. 1). While the non-limiting description with reference to FIG. 8 shows the method steps as being performed by the DFD circuit 200 of FIG. 2, it will be clear to one of ordinary skill in the art that the method steps are not limited to the DFD circuit 200 of FIG. 2, but may also be performed by the circuits of FIGS. 5 and 6, or even other circuits that allow for division of a reference clock signal 110 (FIG. 1) by a real number with any desired degree of precision.

FIG. 9 is a flow chart showing the frequency-division step 830 of FIG. 8 in greater detail. In the preferred embodiment, the DFD circuit 200 (FIG. 2) separates, in step 920, the decimal portion of the real number D 270 (FIG. 2) into a remainder portion (e.g., REM[r:0] 206 (FIG. 2)) having a finite degree of precision, and an error portion (e.g., ERR [r:0] 203 (FIG. 2)) having any desired degree of precision. The DFD circuit 200 (FIG. 2) then replicates, in step 940, the reference clock signal 110 (FIG. 1) to generate a finite number of clock signals 150 (FIG. 1), which are defined by the remainder portion (e.g., REM[r:0] 206 (FIG. 2)). Each of the finite number of clock signals 150 (FIG. 1) is then offset, in step 960, from each of the other finite number of clock signals 150 (FIG. 1) by a fixed phase. Once the phase-offset clocks have been created (steps 940 and 960), the DFD circuit 200 (FIG. 2) selects, in step 980, one of the finite number of clock signals 150 (FIG. 1) as a function of the integer portion (e.g., INT[m:0] 209 (FIG. 2)), the remainder portion (e.g., REM[r:0] 206 (FIG. 2)), and the error portion (e.g., ERR[n:0] 203 (FIG. 2)) of the real number D 270 (FIG. 2). Again, while only DFD circuit 200 (FIG. 2) has been used for illustrative purposes, it is not intended that the method steps associated with FIG. 9 be limited to operation by DFD circuit 200 (FIG. 2).

FIG. 10 is a flow chart showing the step of selecting 980 one of the finite number of clock signals of FIG. 9 in greater detail. The selecting step 980 may be seen as encompassing the step of calculating, in step 1020, an accumulated error (e.g., ERRSUM[n:0] 259 (FIG. 2)) by the DFD circuit 200 (FIG. 2) if any error should exist. Once the accumulated error has been calculated 1020, the DFD circuit 200 (FIG. 2) compares, in step 1040, the calculated accumulated error with the phase-resolution of the finite number of clock signals 150 (FIG. 1). If the accumulated error is calculated 1020 to be greater than the phase-resolution of the clock signals 150 (FIG. 1), then an additional clock phase is added and the appropriate clock signal is chosen, in step 1060, in response to the comparison. If, on the other hand the accumulated error does not exceed the phase-resolution of the clock signals 150 (FIG. 1), then an additional phase is not added, and, again, the appropriate clock signal is chosen, in step 1060, in response to the comparison. Details related to the choosing step 1060 are described with reference to FIG. 2. However, it is not intended that these method steps be limited only to the embodiment of FIG. 2.

As shown through FIGS. 1 through 10, it can be seen that there are several advantages associated with the preferred embodiment of the invention. First, by separating the real number 270 (FIG. 2) into INT[m:0] 209, REM[r:0] 206, and ERR[n:0] 203, accumulating of ERRSUM[n:0] 259 until the edge of one of the finite number of clocks 150 (FIG. 1), it is possible to divide a reference clock signal 110 (FIG. 1) by a real number having any magnitude or any desired degree of precision. In other words, the reference clock signal 110 (FIG. 1) may, in theory, be divided by a real number 270 (FIG. 2) having any desired degree of precision while using only a finite number of circuit components. Additionally, since REM[r:0] 206 controls the resolution of the clock divisions by generating $2^r$ clock signals 150 (FIG. 1), the amount of jitter is reduced as compared to rational rate multiplier (RRM) approaches. Moreover, as shown in the circuits of FIGS. 2, 5, and 6, the preferred embodiment of the invention allows for the implementation of the frequency division function without complex state machines, memory, or the need for direct calculation of variables. Also, as shown in FIG. 7, multiple frequency-divided clocks 270 (FIG. 7) may be generated by the use of a plurality of frequency-divider circuits 200 (FIG. 2), 500 (FIG. 5), 600 (FIG. 6).

In addition to the above mentioned advantages, the preferred embodiment also teaches a system and method for correcting small, accumulated errors that are inherent in systems that have coarse arithmetic precision. Furthermore, the preferred embodiment teaches a system and method for completely specifying the function of a clock phase selection multiplexer.

Although an exemplary embodiment of the present invention has been shown and described, it will be apparent to those of ordinary skill in the art that a number of changes, modifications, or alterations to the invention as described may be made, none of which depart from the spirit of the present invention. For example, while a specific example of a GF MUX 250 has been shown in FIG. 3, it will be clear to one of ordinary skill in the art that other glitch-free MUXs may be used without effect to the circuits of FIGS. 2, 5, and 6. Additionally, while specific divisors D 270 have been chosen to better illustrate the functioning of the invention, it will be clear to one of ordinary skill in the art that these divisors have been arbitrarily chosen for illustrative purposes only. Therefore, it will be clear to one of ordinary skill in the art that the specific numbers used are not intended to limit the invention to those numbers. Also, while a specific example of a multi-phase clock generator 100 (FIG. 1) has been shown, it will be clear to one of ordinary skill in the art that other circuits, such as a multi-output PLL circuit, may be used to generate the finite number of clock signals 150 (FIG. 1). Furthermore, while the preferred embodiment shows CLKOUT 210 (FIG. 2) having a duty cycle less than fifty-percent, it will be clear to one of ordinary skill in the art that the output may be changed to have any desired duty cycle. Thus, it will be clear to one of ordinary skill in the art that certain components may be added or modified without effect to the invention. All such changes, modifications, and alterations should therefore be seen as within the scope of the present invention.

We claim:

1. A system for dividing clock frequencies, comprising:
a reference clock configured to generate a reference clock signal having a reference clock frequency;
a multi-phase clock generator configured to generate a finite number of clock signals from the reference clock signal, wherein each of the finite number of clock signals has the same frequency, wherein each of the finite number of clock signals is offset from each of the other finite number of clock signals by a phase offset, wherein the phase offset between adjacent clocks within the finite number of clocks is the same;
a real number divisor comprising an integer portion and a decimal portion, wherein the decimal portion comprises a remainder portion having a finite degree of precision and an error portion, wherein the finite degree of precision of the remainder portion is proportional to the finite number of clock signals;
an error accumulator configured to accumulate an error term, wherein the accumulated error represents a part of the real number that is not reflected in the finite number of clock signals; and
a glitch-free multiplexer configured to receive the finite number of clock signals, wherein the glitch-free multiplexer is further configured to receive a clock select signal, wherein the glitch-free multiplexer is further configured to select a clock signal from the finite number of clock signals in response to the received clock select signal, wherein the glitch-free multiplexer is further configured to output the selected clock signal, wherein the clock select signal is a function of the integer portion of the real number, wherein the clock select signal is further a function of the remainder portion of the real number, wherein the clock select signal is further a function of the accumulated error.

2. A system for dividing clock frequencies, comprising:
a reference clock configured to generate a reference clock signal having a reference clock frequency;
a multi-phase clock generator configured to generate a finite number of clock signals from the reference clock signal;
a real number divisor comprising an integer portion and a decimal portion, wherein the decimal portion comprises a remainder portion having a finite degree of precision, wherein the finite degree of precision of the remainder portion is proportional to the finite number of clock signals;
an error accumulator configured to accumulate an error term, wherein the accumulated error represents a part of the real number that is not reflected in the finite number of clock signals; and
a glitch-free multiplexer configured to receive the finite number of clock signals and a clock select signal, wherein the glitch-free multiplexer is further configured to select a clock signal from the finite number of clock signals in response to the received clock select signal, wherein the glitch-free multiplexer is further configured to output the selected clock signal as a function of the integer portion of the real number.

3. A system for dividing clock frequencies, comprising:
a frequency divider circuit configured to receive a real number divisor having an integer portion and a decimal portion, the decimal portion comprising a remainder portion and an error portion;
an error accumulator located within the frequency divider circuit, the error accumulator configured to receive the error portion of the real number divisor; and
a glitch-free multiplexer located within the frequency divider circuit, the glitch-free multiplexer configured to select a clock signal from a plurality of clock signals, wherein the selected clock signal is selected as a function of the remainder portion of the real number divisor.

4. The system of claim 3, wherein the decimal portion of the real number divisor is a non-repeating decimal.

5. The system of claim 4, wherein the frequency divider circuit further comprises a multi-phase clock generator configured to generate the plurality of clock signals from a reference clock signal.

6. The system of claim 4, wherein the number of clock signals in the plurality of clock signals is proportional to the remainder portion of the real number divisor.

7. The system of claim 6, wherein the plurality of clock signals is offset from each of the other of the plurality of clock signals by a phase offset.

8. The system of claim 7, wherein the phase offset between adjacent clock signals within the plurality of clock signals is the same.

9. The system of claim 3, wherein the decimal portion of the real number divisor is a repeating decimal.

10. The system of claim 9, wherein the frequency divider circuit is further configured to receive an input word, wherein the input word is a function of the repeating decimal.

11. The system of claim 10, wherein the selected clock signal is further a function of the input word.

12. The system of claim 9, wherein the frequency divider circuit further comprises a multi-phase clock generator configured to generate the plurality of clock signals from a reference clock signal.

13. The system of claim 12, wherein the number of clocks in the plurality of clock signals is proportional to the remainder portion of the real number divisor.

14. The system of claim 13, wherein the plurality of clock signals is offset from each of the other of the plurality of clock signals by a phase offset.

15. The system of claim 14, wherein the phase offset between adjacent clock signals within the plurality of clock signals is the same.

16. A system for dividing clock frequencies, comprising:
a frequency divider circuit configured to receive a real number divisor having an integer portion and a decimal portion, the decimal portion comprising a remainder portion and an error portion, the frequency divider circuit further configured to select a clock signal from a plurality of clock signals, wherein the selected clock signal is a function of the integer portion and the remainder portion of the real number divisor, the frequency divider circuit further configured to generate a propagated error, wherein the propagated error represents a part of the decimal portion of the real number that is not reflected in the plurality of clock signals; and
an error accumulator located within the frequency divider circuit, the error accumulator configured to successively add the propagated error.

17. The system of claim 16, wherein the decimal portion of the real number divisor is a non-repeating decimal.

18. The system of claim 17, wherein the selected clock signal is further a function of the propagated error.

19. The system of claim 17, wherein the frequency divider circuit further comprises a multi-phase clock generator configured to generate the plurality of clock signals from a reference clock signal.

20. The system of claim 17, wherein the plurality of clock signals is offset from each of the other of the plurality of clock signals by a phase offset.

21. The system of claim 20, wherein the phase offset between adjacent clock signals within the plurality of clock signals is the same.

22. The system of claim 16, wherein the decimal portion of the real number divisor is a repeating decimal.

23. The system of claim 22, wherein the frequency divider circuit is further configured to receive an input word, wherein the input word is a function of the repeating decimal.

24. The system of claim 23, wherein the selected clock signal is further a function of the input word.

25. The system of claim 24, wherein the selected clock signal is further a function of the propagated error.

26. The system of claim 25, wherein the frequency divider circuit further comprises a multi-phase clock generator configured to generate the plurality of clock signals from a reference clock signal.

27. The system of claim 26, wherein the plurality of clock signals is offset from each of the other of the plurality of clock signals by a phase offset.

28. The system of claim 27, wherein the phase offset between adjacent clock signals within the plurality of clock signals is the same.

29. A system for dividing clock frequencies, comprising:
a multi-phase clock generator configured to generate a plurality of clock signals;
a frequency divider circuit configured to receive a real number divisor having an integer portion and a decimal portion, the decimal portion comprising a remainder portion and a non-zero error portion; and
a glitch-free multiplexer located within the frequency divider circuit, the glitch-free multiplexer configured to generate a plurality of clock-select signals, the glitch-free multiplexer further configured to select a clock signal from the generated plurality of clock signals in response to a subset of the generated plurality of clock-select signals.

30. The system of claim 29, wherein the decimal portion of the real number divisor is a non-repeating decimal.

31. The system of claim 30, wherein the frequency divider circuit comprises the multi-phase clock generator configured to generate the plurality of clock signals from a reference clock signal.

32. The system of claim 30, wherein the plurality of clock signals is proportional to the remainder portion of the real number divisor.

33. The system of claim 30, wherein the plurality of clock signals is offset from each of the other of the plurality of clock signals by a phase offset.

34. The system of claim 33, wherein the phase offset between adjacent clock signals within the plurality of clock signals is the same.

35. The system of claim 29, wherein the decimal portion of the real number divisor is a repeating decimal.

36. The system of claim 35, wherein the frequency divider circuit is further configured to receive an input word, wherein the input word is a function of the repeating decimal.

37. The system of claim 36, wherein the selected clock signal is further a function of the input word.

38. The system of claim 37, wherein the frequency divider circuit comprises the multi-phase clock generator configured to generate the plurality of clock signals from a reference clock signal.

39. The system of claim 38, wherein the plurality of clock signals is proportional to the remainder portion of the real number divisor.

40. The system of claim 39, wherein the plurality of clock signals is offset from each of the other of the plurality of clock signals by a phase offset.

41. The system of claim 40, wherein the phase offset between adjacent clock signals within the plurality of clock signals is the same.

42. A system for dividing clock frequencies, comprising:
means for receiving a real number divisor having an integer portion and a decimal portion, the decimal portion comprising a remainder portion and an error portion; and means for selecting a clock signal from a plurality of clock signals, wherein the selected clock signal is selected as a function of the remainder portion of the real number divisor.

43. The system of claim 42, wherein the plurality of clock signals is proportional to the remainder portion of the real number divisor.

44. A system for dividing clock frequencies, comprising:
means for receiving a real number divisor having an integer portion and a decimal portion, the decimal portion comprising a remainder portion and an error portion;
means for selecting a clock signal from a plurality of clock signals, wherein the selected clock signal is a function of the integer portion and the remainder portion of the real number divisor;
means for generating a propagated error, wherein the propagated error represents a part of the decimal portion of the real number that is not reflected in the plurality of clock signals; and
means for successively adding the propagated error.

45. The system of claim 44, wherein the selected clock signal is further a function of the propagated error.

46. A system for dividing clock frequencies, comprising:
means for generating a plurality of clock signals;
means for receiving a real number divisor having an integer portion and a decimal portion, the decimal portion comprising a remainder portion and an error portion; and
means for generating a plurality of clock-select signals;
means for selecting a clock signal from the generated plurality of clock signals in response to a subset of the generated plurality of clock-select signals.

47. A method for dividing clock frequencies, comprising the steps of:
receiving a reference clock signal having a reference clock frequency;
dividing the reference clock signal by a real number greater than 1 to produce a desired clock signal having a desired clock frequency, the real number having an integer portion and a decimal portion, the decimal portion having a remainder portion and an error portion;
accumulating the error portion of the real number; and
outputting the desired clock signal.

48. The method of claim 47, wherein the step of dividing the reference clock signal comprises the step of generating a finite number of clock signals.

49. The method of claim 48, wherein the number of clock signals in the finite number of clock signals is proportional to the remainder portion having a finite degree of precision.

50. The method of claim 48, wherein each of the finite number of clock signals has the same frequency.

51. The method of claim 48, wherein the step of generating the finite number of clock signals comprises the step of creating a phase offset between each of the finite number of clock signals.

52. The method of claim 51, wherein the phase offset is the same between each of the finite number of clock signals and each adjacent clock signal of the finite number of clock signals.

53. The method of claim 52, wherein the step of dividing the reference clock signal further comprises the step of selecting one of the finite number of clock signals as a function of the integer portion of the real number, the remainder portion of the real number, and the error portion of the real number.

54. The method of claim 53, wherein the step of selecting one of the finite number of clock signals further comprises the steps of:
accumulating an error term to produce a propagated error, the error term representing a portion of the real number that is not reflected in the finite number of clock signals;
comparing the propagated error with the phase offset; and
choosing one of the finite number of clock signals in response to the comparing step.

55. The method of claim 47, wherein the decimal portion of the real number is a repeating decimal.

56. The method of claim 47, wherein the decimal portion of the real number is a non-repeating decimal.

* * * * *